Jan. 12, 1926.  1,569,414
E. S. WOODFORD
MONOPLANE
Filed Nov. 19, 1921  3 Sheets-Sheet 3
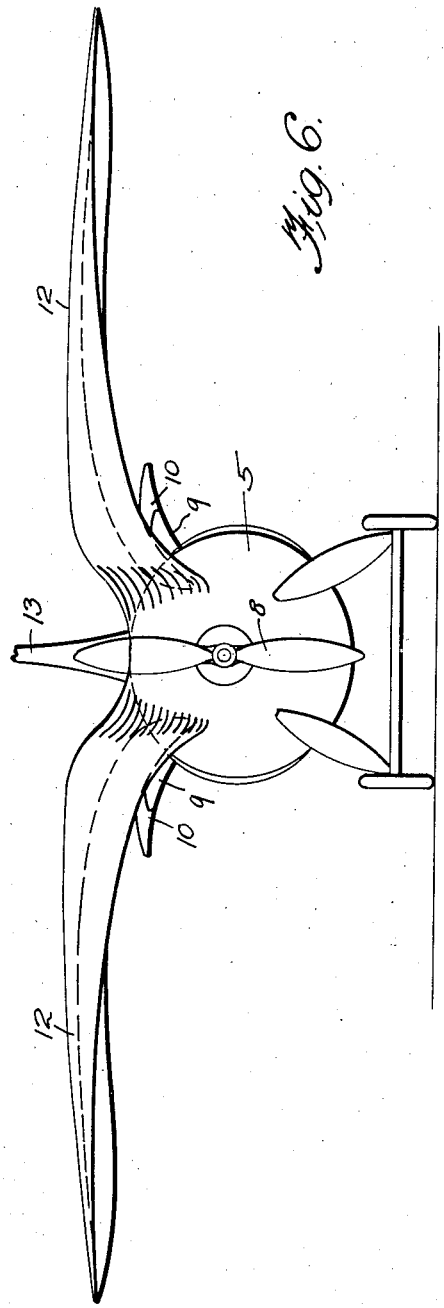
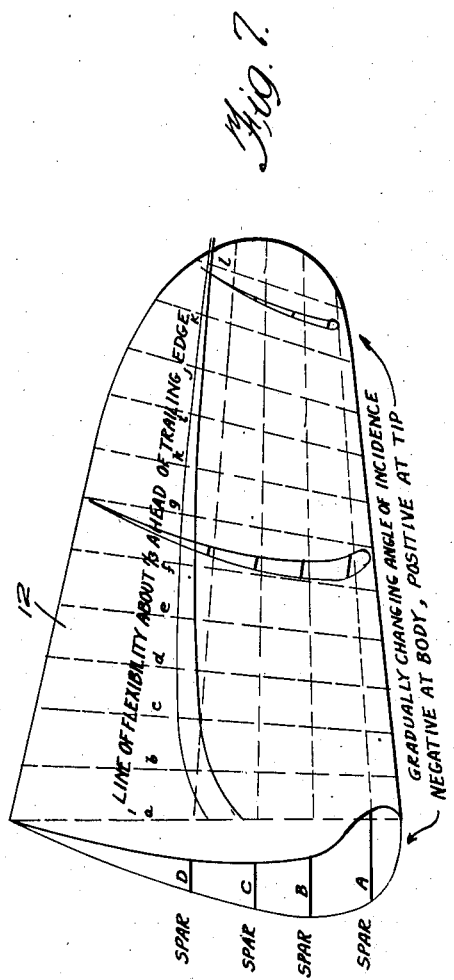
Inventor
Edwin S. Woodford
By Howard A. Coombs
Attorney Patented Jan. 12, 1926.

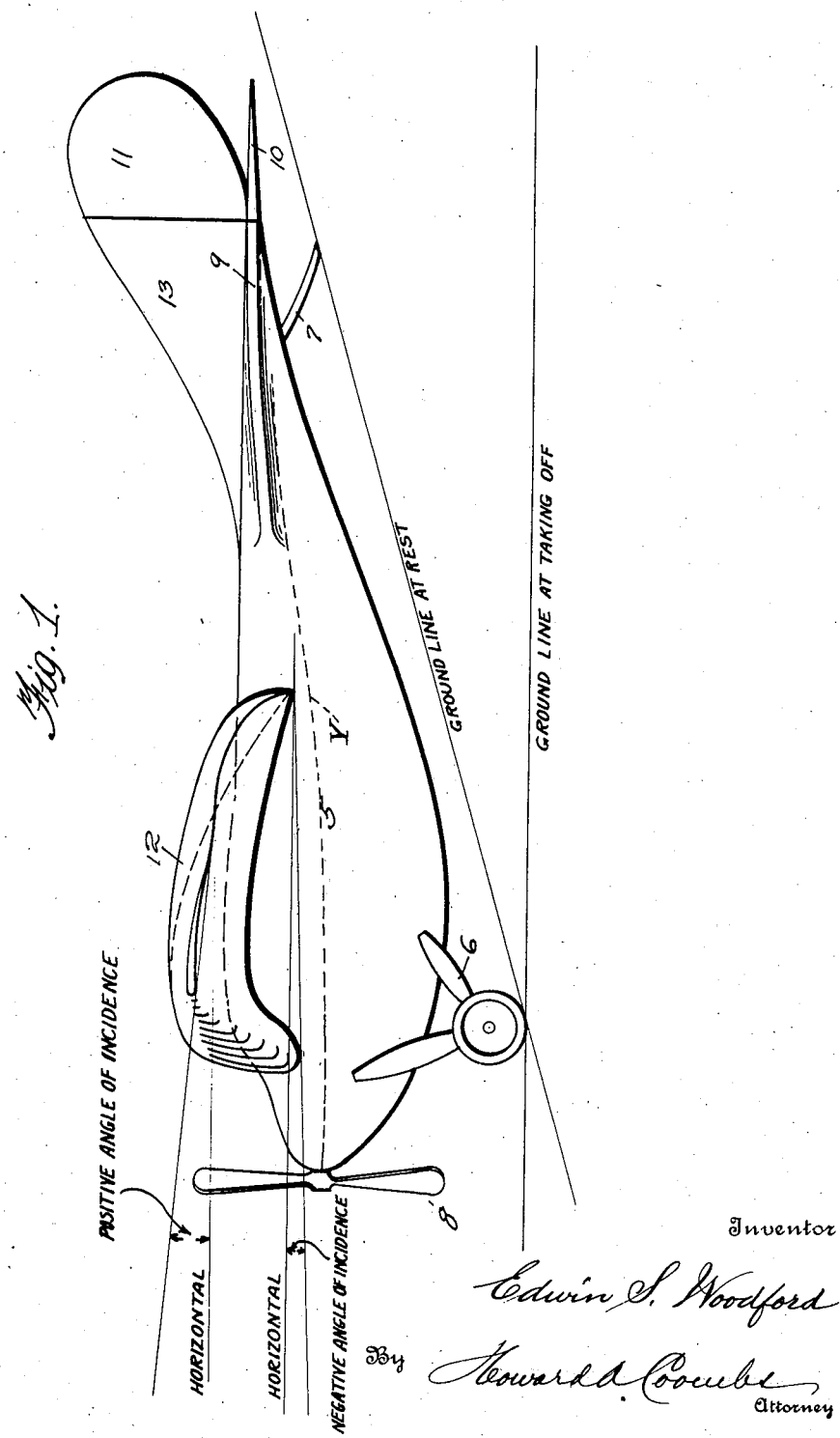

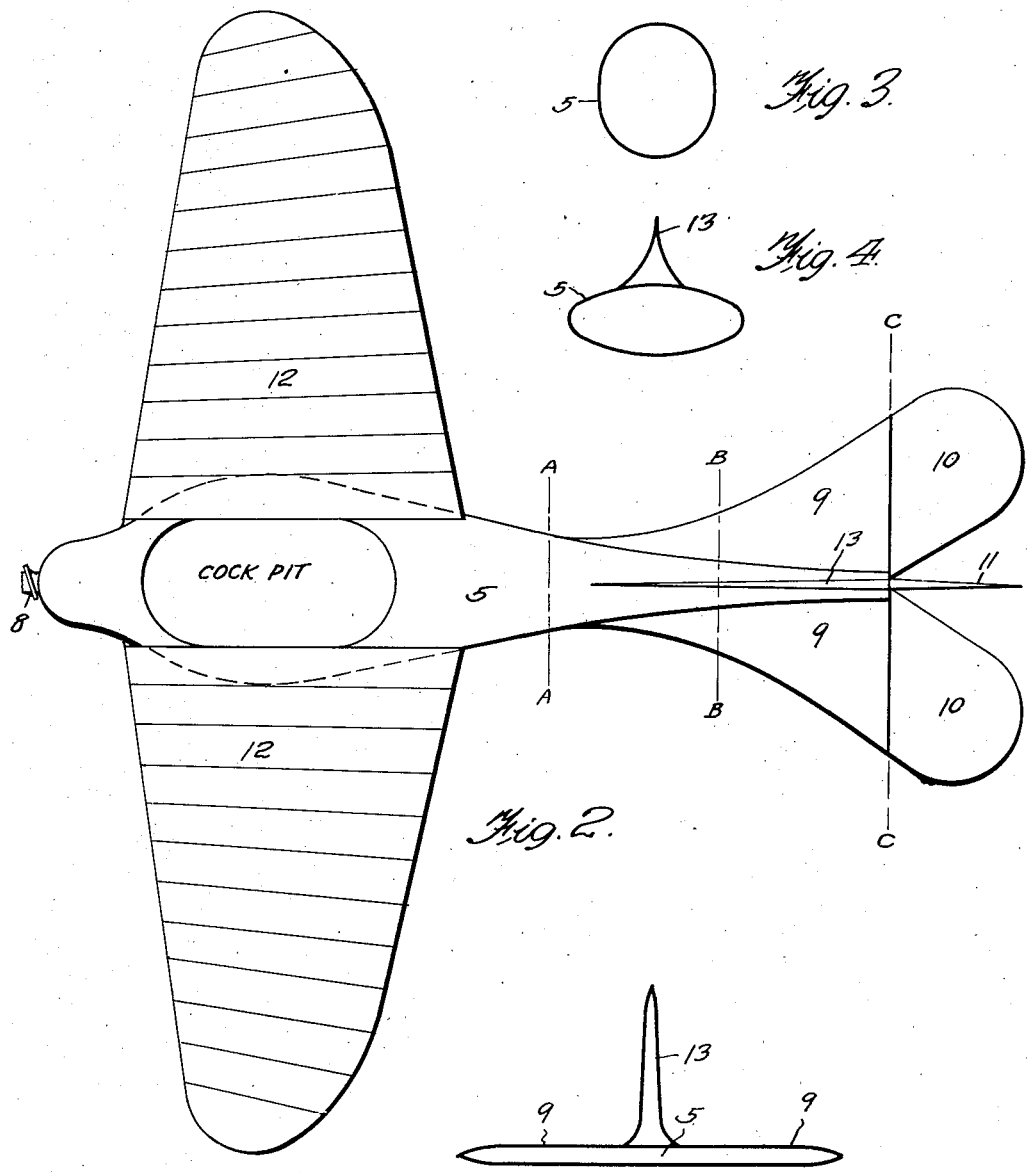

1,569,414

UNITED STATES PATENT OFFICE.

EDWIN S. WOODFORD, OF SALEM, OREGON.

MONOPLANE.

Application filed November 19, 1921. Serial No. 516,351.

*To all whom it may concern:*

Be it known that I, EDWIN S. WOODFORD, a citizen of the United States, residing at Salem, in the county of Marion and State of Oregon, have invented new and useful Improvements in Monoplanes, of which the following is a specification.

This invention relates to airplanes, and more particularly to monoplanes, though certain of the features of construction will be found of utility and advantage in the construction of planes other than monoplanes.

The principal object of my invention is to provide a monoplane, having fuselage and wings so shaped and arranged that increased lifting and soaring efficiency and an actual tractive power of the wings in flight are obtained.

In order to realize this object, I make use of an elliptical fuselage, of bird or fish-like shape, tapering from front to rear and with the major axis of the ellipse horizontal in the larger front portion, vertical in the intermediate portion and horizontal again in the rear portion, in combination with concave wings, arched in both directions, connected to the fuselage above the center thereof and tapered out to flexible tips. These wings are attached to the fuselage in such a way that they merge gradually and harmoniously into the body of the fuselage, whereby the stream line contour of the fuselage will not be impaired. More specifically stated, it is an object of the invention to provide an improved type of wing, having a relatively deep entering edge pointing abruptly downward near the fuselage and having its greatest concavity of cross-section adjacent the fuselage, the wing becoming gradually thinner throughout as it approaches the tip or outer end and from the front to the rear of the wing. The concavity also decreases from the fuselage to the tip and the angle of incidence, which is negative at the fuselage, changes gradually to positive at the tip of the wing. The invention contemplates the connection of such a wing to the fuselage above the point at which maximum diameter of the latter at which point the wing is abruptly arched to a point considerably above the fuselage and then gradually drops toward the point of the wing.

The construction by which these objects and advantages are attained will now be described with reference to the accompanying drawing, in which, Fig. 1 is a side elevation of a monoplane constructed in accordance with the invention;

Fig. 2 is plan view thereof;

Fig. 3 is a transverse sectional view illustrating the contour of the fuselage at A—A, in Figure 2;

Fig. 4 is a transverse vertical section illustrating the contour of the fuselage at B—B in Figure 2;

Fig. 5 is a transverse sectional view illustrating the contour of the fuselage at C—C in Fig. 2;

Fig. 6 is a front elevation of a monoplane constructed in accordance with the invention; and Fig. 7 is a diagrammatic view illustrating the contour of the wing in longitudinal section and at a plurality of points in transverse section.

Like numerals designate corresponding parts throughout the several figures of the drawings.

In the particular embodiment of the invention which I have chosen for purposes of illustration in the accompanying drawings, 5 designates the fuselage which is provided with a landing gear 6 and tail skid 7. These, together with the propelling means 8 and control mechanism, not shown, may be of any desired construction, the invention residing particularly in the fuselage and wings and in the relation which these parts bear to each other. By referring to the drawing, it will be seen that the fuselage is elliptical in transverse section substantially throughout its length, with the major axis horizontal in the forward portion. From a point about in line with the axis of the wings, the horizontal axis of the elliptical fuselage begins to shorten relatively, until the vertical axis becomes the major axis, as shown in the section of Fig. 3. The intersections of the major and minor axes of these elliptical sections trace a line on a vertical longitudinal plane about as shown at Y, making the upper elemental line of the fuselage substantially horizontal in flight. Towards the rear, the vertical axis shortens again, until the horizontal axis becomes the major, as shown in the section of Fig. 4. The section continues to flatten vertically and widen horizontally, until it appears as shown in the section of Fig. 5. This widened horizontal portion of the tail of the fuselage forms stabilizing planes 9, which merge smoothly into the horizontal rudders or elevation planes 10. At a point a short distance in the rear of line A—A, Fig. 2, the lines of the fuselage flow into a vertical fin 13, of which the vertical rudder 11 constitutes a continuation.

The construction described results in providing a fuselage the outlines of which are "stream-line" in contour, thus offering a minimum resistance to the air. The fuselage may be said to be bird-like or fish-like in shape.

The wings, indicated at 12, are wide near the fuselage and taper towards their outer ends to about half the width of their inner ends, said outer ends being rounded. The rear edge of the wing, see Figs. 2 and 7, is a little more inclined horizontally to the transverse axis relatively to the fuselage than the front edge. Each wing comprises four spars extending longitudinally of the same and indicated at A, B, C and D. These spars are spaced apart so as to rigidly support the wing throughout its forward two-thirds, more or less, leaving the rear or trailing edge flexible. The spars taper throughout their length, being heavier at their inner ends, and are arched vertically, rising abruptly at their inner ends and curving downwardly at their outer ends, as shown in Fig. 7. They are secured to the fuselage in any suitable manner and engage the same above its horizontal axis, the forwardmost one, A, slightly above said axis, and the remaining ones gradually higher, as determined by the shape and position of the inner ribs, as later described. The spars are constructed and located in this manner so that the lines of the fuselage flow gradually and smoothly into the wings, both above and below, substantially as shown. The transverse section of the wings, see Fig. 7, have contours gradually changing from that shown at rib $a$ through rib $g$ to rib $l$, that is, gradually tapering from rib $a$, with its heavy, downwardly projecting entering edge, to rib $l$, with its relatively light entering edge. The trailing flexible edge tapers in the same way, but not to so great a degree. The wing, as above described and is shown, is designed to have its structural strength within its own confines, that is, between its upper and lower surfaces, and thus be self-contained. However, while desirable, it is not necessary that it be so constructed to the exclusion of all exterior bracing, trussing or strengthening.

The inner rib $a$, and the spars correspondingly as stated above, is set so that it has a negative angle of incidence, while the outer rib $l$ is set to have a positive angle of incidence, or at least, an angle more nearly positive. The intermediate ribs are set so that their angle of incidence gradually changes from end to end, so as to give the wing a warped shape and so that the angle of incidence changes from negative at a point adjacent the fuselage to positive at the outer ends of the wing. Furthermore, the ribs are set so that the angle of each, relative to the vertical longitudinal plane through the center of the fuselage, continually and gradually increases from the inner rib $a$, which is parallel to said plane, to the outer rib $l$, which is set at some 18 or 20° thereto. The ribs, set at these successive angles, may be shaped exactly like the desired normal section of the wing.

Particular stress is laid on the heavy entering edge of the inner ribs, the deep camber of the under and upper surfaces of the wings adjacent the fuselage, and the negative angle of incidence of the same, the purpose of which is to utilize the tractive force of the wind and of gravity, whereby greater speed and facility of soaring may be attained. The camber of the under surface should be greater than 1/10, (1 in 10) and less than 1:5, while that of the upper surface should be greater than 1/7, (1 in 7), and less than 1:4, so that it is always greater than that of the outer portion of the wing, whereby the deep entering edge of the inner portion of the wing is provided for the purpose above stated.

Having thus described my invention, what I claim is:

1. In an airplane, the combination with a tapering elliptical fuselage flattened out in its tail portion, and concave wings springing upwardly from the sides of the upper half of said fuselage and then becoming horizontal, the thickness and width of said wings diminishing towards the tips, which are flexible, and the thickness also diminishing from front to rear, the rear edges also being flexible.

2. In an airplane, the combination with a tapering elliptical fuselage, the major axis being horizontal in the front and rear portions and vertical in the intermediate portion, concavo-convex wings springing upwardly from the upper half of said intermediate portion and curving around into the horizontal, said wings having flexible rear edges and tips and their front edge being so shaped as to have a negative angle of incidence adjacent the fuselage and a positive angle of incidence adjacent the tips.

In testimony whereof I have hereunto set my hand.

EDWIN S. WOODFORD.